July 31, 1962   J. W. DISTEL   3,046,859
PHOTOGRAPHIC EXPOSURE CONTROL
Filed March 11, 1959   3 Sheets-Sheet 1

INVENTOR.
Joseph W. Distel
BY
Brown and Mikulka
Robert J. Schiller
ATTORNEYS

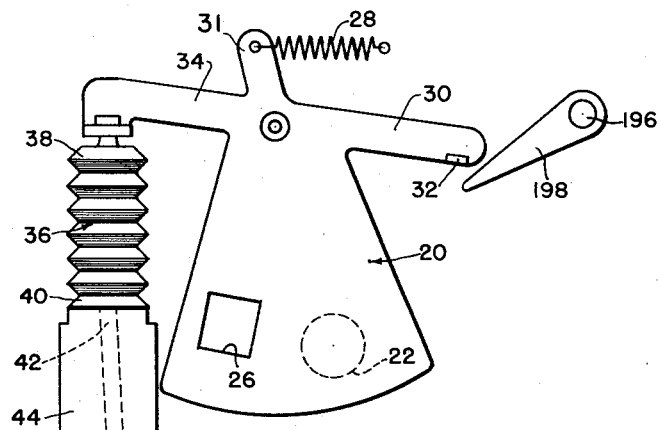
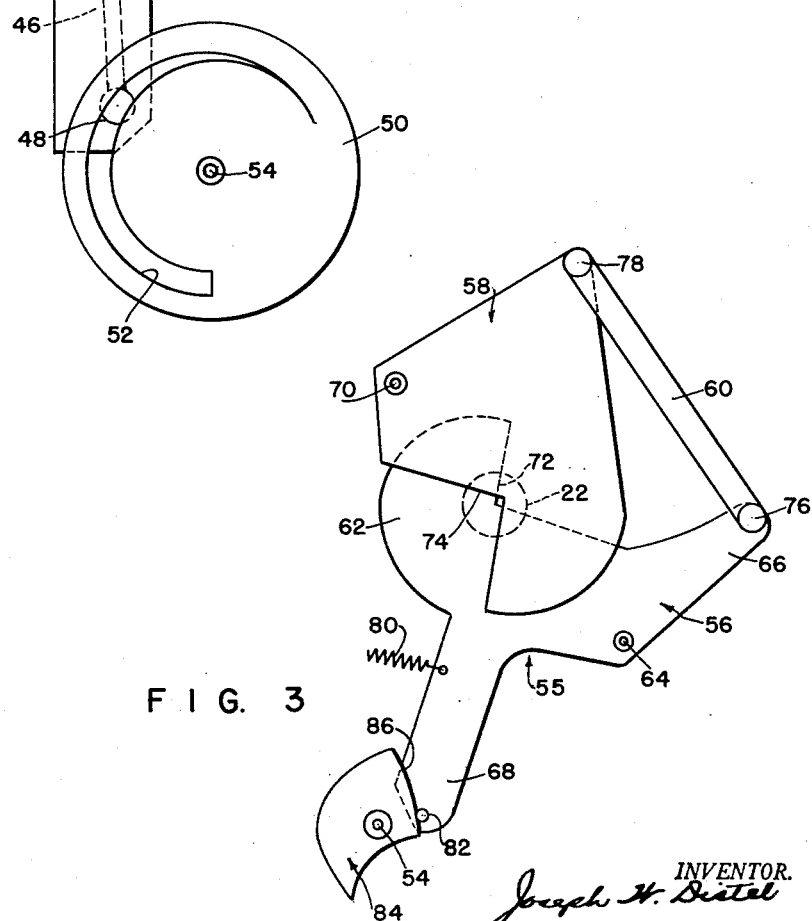

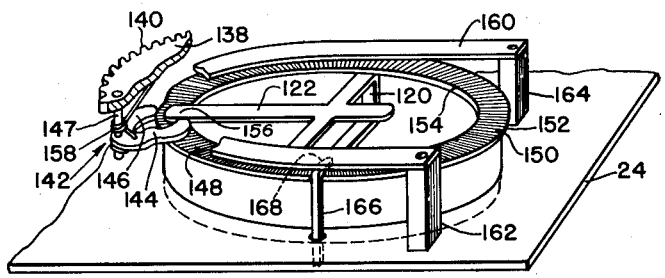
FIG. 4
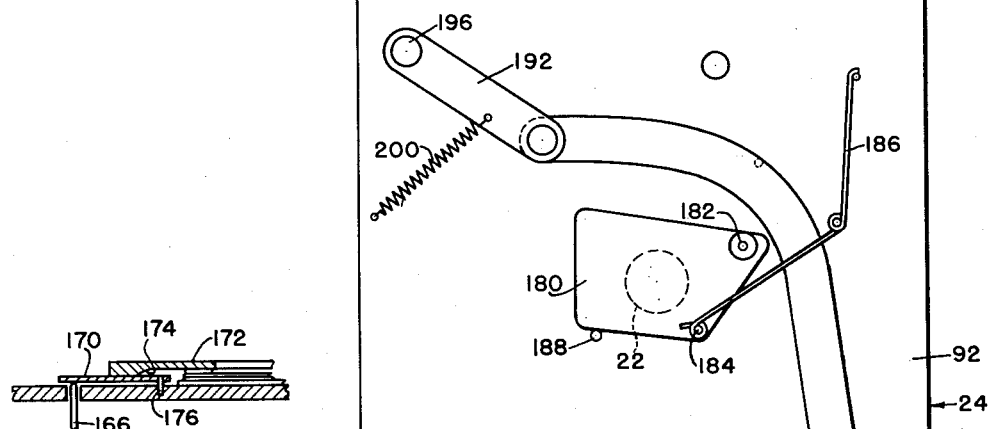
FIG. 6
FIG. 5
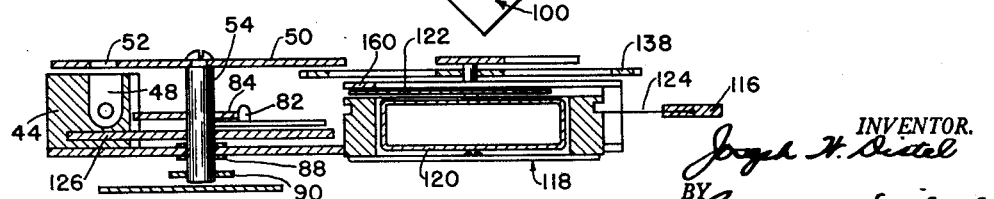
FIG. 7

United States Patent Office 3,046,859
Patented July 31, 1962

3,046,859
PHOTOGRAPHIC EXPOSURE CONTROL
Joseph W. Distel, Boston, Mass., assignor to Polaroid Corporation, Cambridge, Mass., a corporation of Delaware
Filed Mar. 11, 1959, Ser. No. 798,627
3 Claims. (Cl. 95—10)

This invention relates to photography and more particularly to improved photoelectrically responsive exposure control mechanisms for use in photographic apparatus.

Since the development of photoelectric devices, such as photocells, which produce electrical signals, the magnitude of which is a function of the intensity of light incident on the photosensitive surface of the photocell, such cells have been employed in the field of photography, particularly in photometers. With increasing refinement of cameras and photocells have come efforts to link the operation of photocells with cameras in order to utilize the signal output of the cell as a parameter for exposure control of the cameras. However, the output signal of the photocell is usually a linear function of the logarithm of the intensity of radiation incident on the cell over only a comparatively small portion of the range of light intensities in which it may be desirable to operate the camera. This output signal is generally a non-linear function in the remainder of the range. Usually, because the exposure control mechanism of the camera-photocell combination is mechanical, there is provided a galvanometer as a means for translating the electrical output signal of the photocell into a mechanical displacement. However, the angular displacement of the needle of a galvanometer responsive to such signals is not generally a linear function of the input signal to the galvanometer. Thus, the responsiveness of a device, which depends upon the location of an angular position of a galvanometer needle for exposure control, partakes of the non-linearity of the photoelectric means, the galvanometer, or both, unless otherwise corrected. This is a series disadvantage in the employment of photocells and galvanometers in the shutter art, primarily because it is generally desirable that the exposure values of a shutter mechanism be set linearly with respect to the logarithm of the ambient illumination as is generally accomplished with non-photoelectrically controlled cameras.

It is therefore a principal object of the present invention to provide a novel photoelectrically controlled device for automatically setting exposure values of a shutter mechanism in a predetermined manner.

Another object is to provide such an improved control device wherein the exposure setting values of a shutter mechanism may be automatically determined in linear relation to the logarithm of the intensity of ambient illumination.

Still other objects are to provide a novel shutter mechanism including a movable means for setting exposure values, a movable actuating means for initiating exposure and being coupled with said setting means for moving the latter through a range of exposure values, photoelectric means for producing electrical signals responsively to ambient illumination, indicator means for translating said signals into mechanical displacements, and control means coupled with said setting means for movement therewith into engagement with said indicator means, whereby said engagement arrests the movement of said setting means at a position which represents an exposure value as a predetermined function of the intensity of ambient illumination as determined by said displacements of said control device.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a schematic view of a shutter blade and shutter speed control mechanism of the embodiment of FIG. 1;

FIG. 3 is a schematic view of a diaphragm mechanism and control element thereof of FIG. 1;

FIG. 4 is a perspective view, partly in fragment, of a galvanometer and sensing mechanism of FIG. 1;

FIG. 5 is a schematic rear elevation of elements of the embodiment of the invention shown in FIG. 1;

FIG. 6 is a cross section taken along the line 6—6 of FIG. 5; and

FIG. 7 is a cross section taken along the line 7—7 of FIG. 1 and the line 7—7 of FIG. 5.

Figure 1:
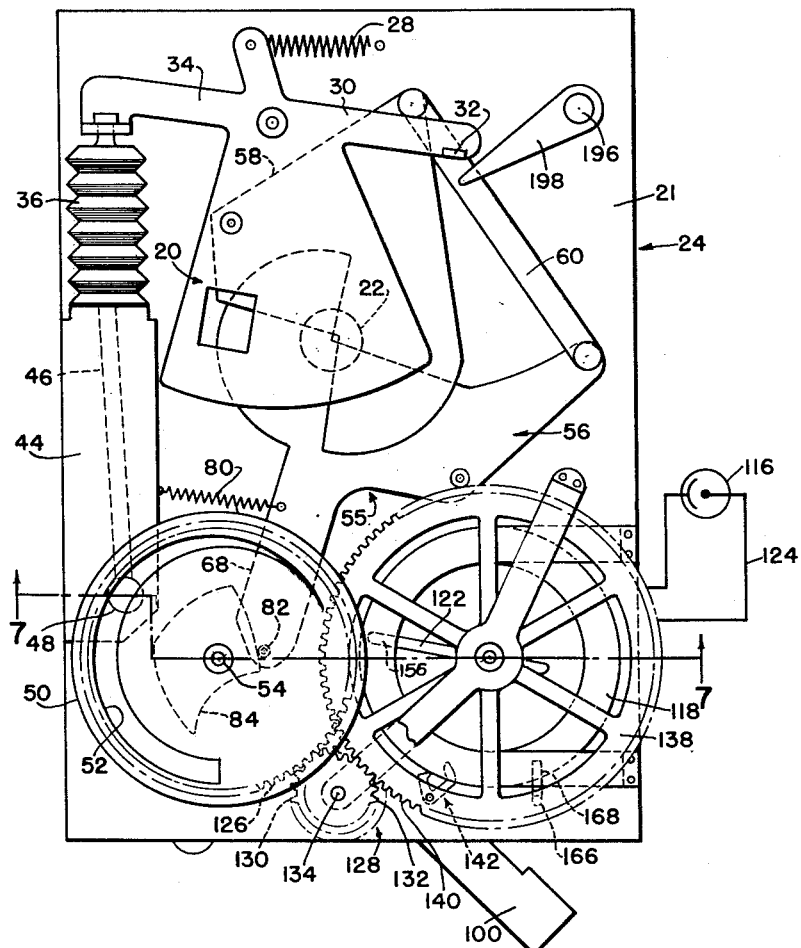
FIGURE 1 is a schematic front elevation showing parts of an embodiment of the present invention, partially in fragment.

In general, this invention concerns a shutter mechanism comprising a shutter and diaphragm assembly wherein exposure parameters such as the time interval of exposure and the effective exposure aperture provided by the assembly are controlled as functions of the intensity of ambient illumination, said functions preferably being linear functions of the logarithm of the intensity. The invention is more specifically concerned with shutter and diaphragm mechanisms of the type wherein the exposure time interval, the effective exposure aperture, or both are set to a predetermined value by movement of control means prior to exposure. The invention also includes a photoelectric means for producing electrical signals in accordance with ambient illumination and an indicator means for translating said signals into mechanical displacements. Means are also provided for sensing or appraising the displacement or position of the indicator means, preferably by engagement therewith. Such a sensing means is adapted for so arresting the setting movement of the control means or elements as to establish predetermined exposure values in accordance with the appraisal made of the position of the indicator means. This is accomplished by a structure wherein the sensing means is coupled for movement with the control means such that, upon appraisal of the position of the indicator means, movement of the sensing means is arrested thereby and arrests movement of the control means. Means are provided for so controlling the engagement of the sensing means with the indicator means that the exposure values set at the arrest of the control means bear a predetermined relation to the position or displacement of the indicator and therefore to the ambient illumination. Such predetermined relation is preferably such that the exposure values set represent linear functions of the logarithm of the intensity of said illumination.

In the preferred embodiment, a simple and compact structure is provided by employing an actuating means for actuating the shutter to effect exposures. The actuating means is coupled with the control elements such that the control means and the sensing means are movable therewith. This provides a mechanism wherein the shutter and diaphragm assembly may be set to automatically predetermined exposure values and actuated for effecting an exposure, all with one movement in a single direction by an actuating means.

Referring now to the drawings, there is shown in FIGURES 1 and 2 a preferred embodiment of the invention which comprises a shutter element such as substantially planar shutter blade 20, for effecting exposures, blade 20 being pivotally mounted on one surface 21 of a support member such as flat backing plate 24 and adjacent an exposure aperture 22 provided in the backing plate. Blade 20 is preferably provided with an opening 26 therein and is so movable substantially in its own plane perpendicularly to an axis through aperture 22 that opening 26 is movable across the exposure aperture between a first position wherein opening 26 lies to one side of the exposure aperture and a second position wherein opening 26 lies to an opposite side of the exposure aperture. Shutter blade 20 also includes a first extending or arm portion 30 and a second extending or arm portion 34. First arm 30 and second arm 34 are disposed on opposite edges of the shutter blade and extend oppositely from one another, preferably in the plane of the shutter blade, and disposed at predetermined angles to a radius from opening 26 to the pivotal axis of the shutter blade. Mounted adjacent the extremity of first arm portion 30 is an upstanding portion such as an engagement pin or lug 32. Second arm 34 is preferably adapted for coupling with a shutter speed control means.

A means for imparting an aperture-uncovering movement to blade 20 from the second to the first position is provided, preferably in the form of a resilient element, such as spring 28, which is normally untensioned when the shutter blade is in the first position and is tensioned when the shutter blade is in the second position. Lug 32 is preferably adapted to be so engageable by a moving element described hereinafter that the movement of said element is transmitted to the shutter blade for moving the latter from the first to the second position and for tensioning spring 28. Spring 28 is preferably anchored at one extremity thereof to backing plate 24 and at the other extremity to a third extending or arm portion 31 which extends from the shutter blade approximately on the opposite edge thereof from opening 26. The combination of elements thus provided comprises a simple apparatus for effecting exposures wherein the exposure time interval is a function of the speed of the aperture-uncovering movement of blade 20.

The invention includes means for controlling the exposure time interval of the shutter element for effecting exposures and, in the form shown, comprises means for controlling the speed of aperture-uncovering movement of blade 20 while under the bias imposed by spring 28. The latter means, for example, comprises a deformable pneumatic device such as substantially elastic bellows 36. The bellows is preferably formed with a first or movable extremity 38 which is attached to the extremity of second arm 34 and is movable therewith. Bellows 36 is also provided with a second or fixed extremity 40 having an opening 42 therein through which a fluid or gas may flow in and out of the interior of the bellows. As a means for providing an anchor for the fixed extremity of the bellows and for providing a passageway to a fluid-flow controlling means, there is provided, in the form shown, a valve block 44 having a tubular passageway 46 therein, valve block 44 being mounted by suitable means upon surface 21. One end of passageway 46 is joined to opening 42 in the bellows, preferably by a leakproof junction, the other end of passageway 46 terminating at a surface of valve block 44 to provide an opening or valve aperture 48.

For controlling the rate of movement of a fluid or gas in or out of bellows 36 by way of passageway 46 and valve aperture 48, a movable valve element such as substantially planar valve disk 50 is provided. Valve disk 50 includes therein, in the form shown, an arcuate opening 52 disposed adjacent the periphery of disk 50 and being variable in width from one extremity of opening 52 to the other. Disk 50 is so mounted upon and rotatable with a pivotal element such as post 54 that opening 52 is movable closely adjacent to and across valve aperture 48 for varying the effective area of aperture 48 through which a fluid or gaseous medium may pass. It is readily apparent that arcuate opening 52 may be so dimensioned as to permit flow in cooperation with and through aperture 48 between a maximum rate determined by the full area of aperture 48 and a minimum rate determined by the limitations upon the area of aperture 48 imposed by the narrowest portion of arcuate opening 52. Other valve means known in the art may be employed in place of valve disk 50 although the particular construction shown herein is preferred for its simplicity, lightness and ease of operation. Additionally, it should be noted that other means for controlling exposure time intervals may be employed in place of a pneumatic device, some examples being a gear retarding mechanism such as shown in U.S. Patent No. 2,800,802 issued July 30, 1957 to K. F. Rentschler, and a magnetic retarding means as shown in U.S. Patent No. 2,486,169 issued October 25, 1949 to M. Kaplowitz.

Referring now to FIGURES 1 and 3 of the drawings, there is shown included in the invention a movable diaphragm means indicated generally by the reference numeral 55. Diaphragm means 55 is preferably of the double-bladed, linkage type and comprises a first or movable master blade 56 and a second or movable slave blade 58, blades 56 and 58 being pivotally connected to one another by means such as link 60. Master blade 56 comprises an approximately planar elongated member having a wide central portion 62 and is mounted by suitable means such as pivot 64 upon surface 21 of plate 24. The master blade also includes elongated portions 66 and 68 extending from central portions 62 substantially oppositely to one another. Slave blade 58 comprises a substantially planar element which is mounted by suitable means such as pivot 70 upon surface 21 of plate 24, pivot 70 and pivot 64 being disposed on substantially opposite sides of exposure aperture 22. As a means for selectively blocking light transmitted by aperture 22 and for defining a portion of the periphery of an effective exposure aperture, central portion 62 of the master blade is provided with an occluding edge which, in the form shown, comprises a notch 72 which is disposed in operative relation to the exposure aperture. Slave blade 58, in the form shown, includes a similar notch 74 which provides a covering edge for defining the remaining portion of the periphery of an effective exposure aperture. Link 60 is pivotally connected at one extremity thereof by pivot 76 which is mounted on elongated portion 66 of the master blade and is also pivotally connected at the other extremity thereof by pivot 78 which is mounted upon a portion of slave blade 58. The diaphragm mechanism thus provided comprises a means for establishing a plurality of effective exposure apertures, a transverse movement of elongated portion 68 for rotating master blade 56 about pivot 64 being transmitted through linkage 60 to the slave blade such that both the master and slave blades move to expand or contract an area coincident with a portion of exposure aperture 22 and defined by the positions of notches 72 and 74. It is readily apparent that the configuration of the angles and edges of the notches may be varied to provide distinctively shaped and sized effective exposure apertures.

Resilient means such as spring 80 are preferably provided for biasing the diaphragm means into a first position wherein the effective exposure aperture defined by the notches in blade 56 and 58 is at a minimum, spring 80, in the form shown, being anchored at one extremity to plate 24 and at its other extremity to elongated portion 68 of master blade 56. Means, such as cam means, are also provided for adjusting the effective aperture by moving the diaphragm means between said first position and a second position wherein the effective exposure aperture provided by the cooperation of the diaphragm means and the exposure aperture is at a maximum. The cam means comprises an engageable cam follower such as pin 82 mounted adjacent that extremity of elongated portion 68 which is furthest from pivot 64, pin 82 projecting approximately perpendicularly from the planar surface of the master blade. The cam means also comprises, in the form shown, a cam 84 so mounted and preferably keyed to post 54 as to be rotatable therewith. Cam 84 is provided with a cam surface 86 with which pin 82 is urged into slidable engagement by virtue of the bias imposed by spring 80. Cam surface 86 may comprise a continuous or non-continuous surface and is preferably shaped to provide a predetermined rotational movement of the master blade upon a predetermined angular rotation of cam 84 such that the effective exposure aperture provided by such rotational movement of the master blade is a function of the particular shape in which surface 86 is formed. It should be noted that other types of adjustable diaphragm means may also be employed, an example being the well-known iris type.

In the preferred embodiment, means are provided for coupling the movements of both the exposure time interval control means and the means for adjusting the effective exposure aperture disk in a predeterminedly related manner. In the preferred embodiment shown best in FIG. 7, this means includes post 54 to which both the valve disk and cam member are keyed. Post 54 is so mounted on plate 24 that portions of the post extend approximately perpendicularly outwardly from both surfaces of the plate, post 54 being rotatable about its longitudinal axis. Suitable bearing means 88 are preferably provided for permitting easy rotation and for retaining the post from movement along its longitudinal axis. The coupling means also comprises a means such as circular gear 90 for rotating post 54, gear 90 being mounted for rotation upon and with the extremity of that portion from post 54 which extends outwardly from second surface 92 of plate 24.

As shown in FIG. 5, a moving means for imparting a rotational force to gear 90 comprises a second circular or idler gear 94, which is rotatably mounted upon surface 92 by appropriate bearing means and which is disposed in meshing engagement with gear 90. The moving means also includes a substantially planar gear segment 96 mounted for rotation about pivot 98 on surface 92 and being in meshing engagement with idler gear 94. An actuating means, such as bell crank 100 having a first arm 102 and a second arm 104 disposed at an angle to one another, is mounted at the junction of the arms for rotation about pivot 98 in a plane approximately parallel to the plane of movement of segment 96.

A resilient linkage means such as hairpin spring 106 is disposed, in the form shown, such that a portion thereof is coiled about pivot 98 between bell crank 100 and segment 96, spring 106 also including two approximately linear extending end portions 108 and 110 disposed to one another at an angle in approximately the same plane. End portion 108 is anchored to segment 96, as at hole 112, and end portion 110 is similarly anchored to arm 104 of bell crank 100, as at hole 114.

As a means for determining the intensity of ambient illumination, there is preferably provided a photosensitive device, such as photocell 116 shown in FIGURES 1 and 7, adapted for providing an electrical signal output which is a function of the intensity of light incident thereon. Photocell 116 is preferably disposed for exposure to light coming from the field of view of the shutter and diaphragm assembly, and is preferably mounted upon backing plate 24, but may, of course, be mounted elsewhere. As a means for translating the signals produced by photocell 116 into mechanical displacements, there is provided, in the preferred embodiment, galvanometer 118 having a rotatable coil 120 and an indicating means, such as needle 122, mounted for rotation with coil 120. Leads 124 are provided for conducting the electrical signals from photocell 116 to galvanometer 118. Galvanometer 118 is preferably of the type well known in the art wherein coil 120 and coupled needle 122 will assume an angular position responsively to the intensity of the electrical signals produced by photocell 116. In the embodiment shown in the drawings, galvanometer 118 is mounted on plate 24 in a substantially fixed relation thereto. However, as a means for compensating for different ASA film speeds of photographic films employed in cameras used with the invention, the galvanometer may be mounted on plate 24 for rotation with respect thereto.

It should be noted that, in the form shown in FIGURE 1, valve disk 50 is mounted on the extremity of that portion of post 54 which extends outwardly from surface 21 of plate 24, and cam 84 is mounted on post 54 between disk 50 and surface 21. As a means for transmitting rotational forces between post 54 and means for sensing or appraising the equilibrium position of needle 122, there is provided a gear train comprising substantially flat, third circular gear 126 axially mounted on post 54 between cam 84 and surface 21. Gear 126 is keyed to post 54 for movement therewith in a plane substantially parallel both to the plane of movement of disk 50 and to surface 21. Gear 126 is, in the form shown, so dimensioned that the radius of its pivotal axis to the toothed periphery thereof is substantially greater than the maximum radial dimension of cam 84. The gear train also includes pinion gear 128 which comprises first gear portion 130 and second gear portion 132 mounted substantially parallel to one another and keyed to shaft 134. Shaft 134 is mounted upon plate 24 for rotation about its longitudinal axis and is so disposed that first gear portion 130 is in meshing engagement with third circular gear 126.

As a means for sensing or appraising the position of needle 122 there is provided a device which includes a movable means, such as substantially circular wheel 138, for mounting a sensory element. Wheel 138 is preferably mounted for rotation at its hub adjacent galvanometer 118 coaxially with the axis of rotation of coil 120 and is rotatable independently of the coil in a plane substantially parallel to the plane of movement of needle 122. Wheel 138 is provided about its arcuate external periphery with a plurality of gear teeth 140 and is so disposed that teeth 140 are in meshing engagement with second gear portion 132 of pinion gear 128. It may therefore be seen that wheel 138 is coupled through the gear train for movement with post 54 and the elements keyed to the latter.

A sensory element 142 is provided and includes a substantially flat, arcuate sensor arm 144 and a substantially flat follower arm 146, the two arms being joined at respective extremities in substantially parallel adjacent planes at a predetermined angle to one another to form a tong-like configuration. Sensory element 142 is mounted for rotation as a unit about pin 147 which extends through the junction of the two arms. Pin 147, in turn, is mounted upon wheel 138 adjacent the periphery thereof. Sensory element 142 is thus mounted for movement with wheel 138 and for rotation independently thereof such that both arms are movable with one another in their respective planes substantially parallel to the plane of movement of wheel 138.

As shown in FIG. 4, rotatable coil 120 of galvanometer 118 is mounted for movement in an approximately cup-shaped housing 148 which includes an approximately circular flanged lip 150 so disposed that the plane of movement of needle 122 is substantially parallel and adjacent thereto. Flanged lip 150 is dimensioned such that the maximum radius of the outer periphery 152 thereof and the minimum radius of the inner periphery 154 thereof are, respectively, so substantially greater and substantially less than the length of needle 122 that extremity 156 of the needle lies between these radii at substantially all positions of equilibrium of the needle. Wheel 138 is so mounted that sensory element 142 is normally disposed with follower arm 146 in engagement with outer periphery 152 of lip 150 and with sensor arm 144 movable in a plane substantially parallel with the plane of flanged lip 150 and preferably in the same plane as the plane of movement of needle 122 so as to be engageable therewith. It should be noted that outer periphery 152 is so shaped as to present a cam surface against which follower arm 146 is held in sliding engagement by resilient means such as spring 153. The cam surface defined thus by periphery 152 may be formed to present any one of a plurality of predetermined configurations, the preferred shape, however, being described hereinafter. In the form shown, spring 153 comprises a hairspring mounted about pin 147 and anchored at its extremities respectively upon wheel 138 and arm 144 for biasing sensory element 142 in a clockwise direction.

Inasmuch as needle 122 is preferably mounted for easy rotation and it is therefore possible to disturb the equilibrium position thereof by vibration or other physical forces external to the invention, it is desirable in the preferred form to provide means for holding the needle in a releasably retained stationary position during movement of wheel 138. Additionally, as sensory arm 144 is adapted to engage needle 122 to sense preferably the equilibrium position thereof, it is preferred that needle 122 be held in a substantially stationary position at least during engagement of arm 144 therewith. Also, it is preferred that needle 122 be retained or clamped in a stationary position so that an exposure may be preset prior to movement of the shutter blade to effect said exposure. As shown in FIGS. 1 and 4, there is provided such a releasable retaining means which may take the form of flat resilient clamping member 160 (shown in fragment in FIG. 4). Member 160 is preferably U-shaped and composed of a resilient material, being mounted upon posts 162 and 164 and extending from plate 24 such that the arcuate portion of the U-shape is substantially parallel with that arcuate portion of flanged lip 150 which is traversed by the range of positions of needle 122. Clamping member 160 is therefore biased by its own resiliency toward flanged lip 150 so as to firmly engage needle 122 between member 160 and lip 150, follower arm 144 being so dimensioned as to be movable freely between flanged lip 150 and clamping member 160 when the clamping member is in engagement with needle 122. Means are provided for moving the clamping member in and out of engagement with needle 122 and, in the form shown in fragment in FIG. 4, comprise elongated lifting pin 166 mounted on backing plate 24 for sliding movement therethrough, and including extending portion 168 at one extremity thereof. Pin 166 is so disposed that extending portion 168 is located between clamping member 160 and flanged lip 150 at a position which does not interfere with the traverse of needle 122. As may be seen in FIG. 6 wherein pin 166 is shown in fragment, extending portion 168 is in engagement with clamping member 160, the other extremity of the lifting pin being in engagement with resilient means such as flat spring 170. Thus, pin 166 is biased along its long axis in a first direction by the resiliency of clamping member 160 and is biased in the opposite direction by flat spring 170. In the preferred embodiment, the bias imposed by member 160 is substantially greater than the bias imposed by spring 170 so that member 160 would tend to move into engagement with needle 122. However, as a means for so moving pin 166 that the bias imposed thereon by member 160 is overcome, and member 160 is therefore retained out of engagement with the needle, bell crank 100 is provided with a projecting portion 172 having a cam surface 174. Cam surface 174 is movable with bell crank 100 between a first position wherein surface 174 is in engagement with spring 170 and a second position wherein surface 174 is out of engagement with spring 170. At the first position, surface 174 is so in engagement with spring 170 that the spring retains pin 166 in a position at which portion 168 retains member 160 out of engagement with needle 122. At the second position, of course, cam surface 174 being out of engagement with spring 170, the bias of clamping member 160 is permitted to overcome the bias imposed by spring 170 on pin 166, thereby allowing member 160 to move into a firm engagement with needle 122. Spring 170 is preferably anchored at one extremity thereof upon plate 24 by suitable mounting means as at 176.

For covering exposure aperture 22 during movement of blade 20 from the first position to the second position, there is provided a shutter blind means which, in the form shown in FIG. 5, comprises a substantially planar, opaque plate 180. Plate 180 is preferably mounted by suitable mounting means such as pivot 182 upon surface 92 of plate 24 for movement between a first position wherein plate 180 covers aperture 22 and a displaced position wherein plate 180 uncovers aperture 22. The shutter blind means also includes an upstanding portion such as pin 184 which is so disposed at a predetermined distance from pivot 182 that a force exerted on pin 184 will pivot plate 180 to the displaced position. As a means for biasing plate 180 into the first or covering position, there is provided a resilient means such as spring 186 which is centrally mounted upon surface 92 of plate 24, one extremity of spring 186 being anchored to plate 24, the other extremity of spring 186 being anchored, for example, at pin 184. Stop means, such as pin 188, is preferably provided for limiting the pivotal movement of plate 180 under the bias of spring 186, thus establishing the first or covering position of plate 180. Because of the structure and operation of shutter blade 20 employed in the embodiment described herein, a shutter blind is used therewith. However, a shutter blind need not necessarily be used with other forms of shutters as is known in the art.

Actuating means for moving the various elements of the invention is shown, particularly in FIG. 5, and includes, in addition to bell crank 100, elongated actuating arm 190 which is pivotally mounted at one extremity upon second arm 104 of the bell crank. The other extremity of actuating arm 190 is pivotally connected to one extremity of elongated rocker arm 192. Intermediate its extremities, arm 190 includes extending portion 194 which is disposed to releasably engage pin 184 upon a predetermined movement of arm 190. Arm 190 is disposed to be movable in a plane adjacent and substantially parallel to the plane of surface 92.

Rocker arm 192, in the form shown, is mounted at its other extremity upon one extremity of and is movable with rotatable post 196. Post 196 is so mounted in plate 24 that portions of the post extend approximately perpendicularly outward from both surfaces of the plate and post 196 is rotatable about its longitudinal axis. That extremity of post 196 which extends through surface 21 of plate 24 provides a supporting means for a movable element, such as tripper arm 198, which is mounted upon post 196 for rotation therewith in a plane approximately perpendicular to the longitudinal axis of post 196. Tripper arm 198 is preferably so dimensioned and located as to be releasably engageable with engagement lug 32 of shutter blade 20 for moving blade 20 from its first to second position. As a means for so biasing post 196 that tripper arm 198 is rotatable out of engagement with engagement lug 32 and extending portion 194 is also movable out of engagement with pin 184 there is provided a resilient member such as spring 200. In the form shown, with extremities of spring 200 are respectively anchored upon an intermediate portion of rocker arm 192 and upon a portion of surface 92 of plate 24.

In operation, photocell 116 when irradiated by ambient illumination produces electrical signals in accordance with the intensity of said radiation, the signals being conducted to galvanometer 118 by leads 124. In accordance with well-known principles, coil 120 and needle 122 coupled thereto are deflected to a position of equilibrium in accordance with said signals. Force applied by an operator of the invention to bell crank 100 rotates the bell crank (in a counter-clockwise direction from the standpoint of FIG. 5) about pivot 98. The rotation of bell crank 100 is transmitted to segment 96 by hairpin spring 106 which causes segment 96 to rotate in the same direction. This rotation of segment 96 is transmitted through idler gear 94 to gear 90 thus rotating post 54 about its longitudinal axis. Movement of post 54 is accompanied by rotation of both valve disk 50 and cam 84, both being keyed to and rotatable with the post. Valve disk 50 is so disposed with relation to aperture 48 that the rotation of the valve disk with the post is from a first position wherein the effective area of aperture 48 is at a minimum in a direction wherein the cooperation between opening 52 and aperture 48 presents an increasing effective aperture area.

Cam 84 is so disposed with respect to cam follower 82 and in sliding engagement therewith that the diaphragm means is movable from its first position of minimum effective exposure aperture in a direction wherein the area of said exposure aperture changes as a function of both the angular rotation of the cam 84 and the shape of the cam surface. It is therefore apparent that this rotation of cam 84 and valve disk 50 continuously changes the effective exposure aperture and shutter speed. In the preferred embodiment, however, these changes are respectively from maximum to minimum of aperture, and minimum to maximum of shutter speed, thereby providing a plurality of exposure values.

As the cam member and valve disk are rotated, third circular gear 126 also rotates with post 54. This position of gear 126 is transmitted through pinion gear 128 to wheel 138, thus rotating wheel 138 about its pivotal axis. As wheel 138 rotates, spring 158 urges follower arm 146 of sensory element 142 into sliding engagement with the shaped outer periphery 152 of flanged lip 150 such that the rotation of the sensory element about pin 147 is controlled by the shape of the outer periphery. Consequently, the angle that sensor arm 144 makes with a radius of wheel 138 and consequently with needle 122 varies according to the configuration of the outer periphery. Movement of all of the rotatable elements heretofore mentioned with the movement of bell crank 100 continues until sensor arm 144, which moves across the plane of flanged lip 150, intersects and engages needle 122 at the equilibrium position established by the electrical signals from the photocell.

It should be noted that with the initial rotation of bell crank 100, in a predetermined direction, cam surface 174 of projecting portion 172 moves out of engagement with spring 170 allowing the resiliency of clamping member 160 to urge pin 166 toward plate 24 such that clamping member 160 firmly engages needle 122 at its equilibrium position. The engagement of sensor arm 144 with needle 122 thereby arrests the rotation of wheel 138 which in turn arrests the rotation of pinion gear 128 and the accompanying rotation of third circular gear 126, the valve disk and cam member 84. As the rotation of these elements is arrested, so is the rotation of post 54, gears 90 and 94 and gear segment 96. Because the linkage between gear segment 96 (now arrested in rotation) and bell crank 100 comprises spring 106, the rotation of bell crank 100 under the impetus provided by the operator of the invention will continue against the bias of spring 106. It is therefore apparent that the arrangement of bell crank 100, spring 106 and gear segment 96 comprises a manual over-riding means whereby the arresting of rotation of the various elements does not prevent the operator from continuing the rotation of bell crank 100 in the predetermined direction. Therefore, following the engagement of sensor arm 144 with needle 122, at which point the exposure parameters of the device have been set in accordance with the intensity of ambient illumination, the operator may continue the rotation of bell crank 100 in the predetermined direction such that actuating link 190 is moved into a position wherein extending portion 194 engages pin 184 moving cover blind 180 against the bias of spring 186 to an uncovering position with respect to aperture 22.

As actuating link 190 moves such that extending portion 194 is moved toward engagement with pin 184, rocker arm 192 is rotated against the bias of spring 200 rotating post 196 and attached arm 198. The rotation of post 196 and arm 198 moves arm 198 into engagement with engagement lug 32, rotating shutter blade 20 about its pivotal axis against the bias of spring 28 and moving opening 26 from one side of aperture 22 to the other side of aperture 22 before the engagement of extending portion 194 with pin 184 has moved shutter blind 180 to an uncovering position. As shutter blade 20 is so rotated against the bias of spring 28, arm 34 compresses bellows 36 to a collapsed position. With continued rotation of bell crank 100, extending portion 194 having engaged pin 184 with consequent movement of shutter blind 180 to uncovering position, the arc of rotation of the unpivoted extremity of arm 198 no longer intersects the arc of rotation of engagement lug 32, hence arm 198 disengages the engagement lug allowing shutter blade 20 to return to its initial position under the bias of spring 28. It is therefore apparent that the exposure values are set and the shutter blade actuated, all in a single movement of bell crank 100 in one direction. The return movement of shutter blade 20 which effectuates the exposure across the now opened aperture 22 is opposed by the expansion of bellows 36. The rate of movement of blade 20 and consequently the exposure time interval afforded by the movement of opening 26 across aperture 22 is a function of the rate of deformation, in this case of the expansion, of the bellows. The rate of deformation of the bellows, in turn, is a function of the rate of fluid flow into bellows 36 through passageway 46, and the rate of fluid flow is controlled by the effective area of aperture 48 determined by the combination of aperture 48 and opening 52 in valve disk 50. It is therefore apparent that the engagement of sensor arm 144 with needle 122 simultaneously establishes both the exposure aperture provided by the diaphragm means 55 and the time interval of exposure afforded by shutter blade 20. This combination of aperture and interval is, of course, known as an exposure value. The angular positions of valve disk 50 and cam member 84 are, of course, determined by the angular position of wheel 138, the angular position of the latter being a function of the equilibrium position of needle 122. Inasmuch as the position of wheel 138 at engagement of the sensor arm and the needle is also a function of the angle that the sensor arm makes with the needle for a predeterminedly dimensioned sensor arm, and the angle of the sensor arm with the needle is determined by the configuration of the outer periphery of the fllanged lip, it is apparent that the "non-linearity" of the equilibrium position of the needle with respect to the intensity of ambient illumination incident on the photocell may readily be corrected or compensated. Such compensation is accomplished by providing the outer periphery of the flanged lip with a predetermined configuration shaped to so control the movement of follower arm 146 as to establish a plurality of exposure values which bear a log-linear relationship to the intensity of ambient illumination determined by the photocell.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A control device for shutter mechanisms which comprise exposure value setting means movable through a range of exposure value settings, and a galvanometer including a rotatable indicator having a rotational displacement in accordance with electric signals produced by photoelectric means, said device including rotatable mounting means mounted coaxially with said indicator, a sensory element mounted on said mounting means for movement therewith and for rotation relative to the latter, said sensory element including a portion thereof engageable with said indicator for arresting the movements of both said mounting means and said setting means in accordance with the position of the indicator and with the position of said sensory element relative to said mounting means at engagement, and cam means stationary with respect to both said indicator and said mounting means and having surface predeterminedly shaped in accordance with a displacement of said indicator responsively to said photoelectric means, said sensory element including a cam follower portion in sliding engagement with said surface for so varying said relative position during movement of said mounting means and in accordance with the shape of said surface that the arrest of said setting means is at a position determined both by the displacement of said indicator and the shape of said surface.

2. A control device for shutter mechanisms which comprise an exposure value setting member movable through a range of exposure value settings, and an indicator movable to a plurality of positions responsively to electrical signals produced by photoelectric means in accordance with illumination incident thereon, said device including rotatable mounting means coupled with said setting member, a sensory element mounted on said mounting means for movement therewith and for rotation relative thereto, said sensory element being movable into engagement with said indicator during movement of said mounting means whereby the movements of both said mounting means and said setting member are arrested in accordance with the position of said indicator and with the position of said sensory element relative to said mounting means, cam means including a surface which is so shaped that the position at which said sensory element engages said indicator is determined by said surface as a substantially linear function of the logarithm of the intensity of said illumination, and cam follower means slidably engaging said surface and connected with said sensory element for varying the position thereof relative to said mounting means during movement of said mounting means.

3. A control device for shutter mechanisms as defined in claim 2 wherein said sensory element includes a first arm portion and a second arm portion connected at a respective extremity of each and extending in substantially parallel planes at a predetermined angle to one another, said element being so mounted on said mounting means for movement therewith and for rotation about a pivotal axis which extends through the junction of said arm portions that upon movement of said mounting means said first arm portion is movable into engagement with said indicator and said second arm portion comprises said cam follower means for rotating said first arm portion in a predetermined manner for controlling the angle of said engagement.

References Cited in the file of this patent
UNITED STATES PATENTS

| | | |
|---|---|---|
| 2,780,971 | Fahlenberg | Feb. 12, 1957 |
| 2,800,844 | Durst et al. | July 30, 1957 |
| 2,885,938 | Durst | May 12, 1959 |
| 2,887,025 | Rentschler et al. | May 19, 1959 |
| 2,925,760 | Broschke | Feb. 23, 1960 |